United States Patent [19]

Matsuda et al.

[11] Patent Number: 4,982,348
[45] Date of Patent: Jan. 1, 1991

[54] METHOD FOR DETERMINING VEHICLE SPEED DURING ACCELERATION OF A FOUR-WHEEL DRIVE VEHICLE

[75] Inventors: Shohei Matsuda; Tadatoshi Haga; Kougyoku Go; Hiroshi Ikegami, all of Wako, Japan

[73] Assignee: Honda Giken Kogyo Kabushiki Kaisha, Tokyo, Japan

[21] Appl. No.: 356,727

[22] Filed: May 25, 1989

[30] Foreign Application Priority Data

Jun. 13, 1988 [JP] Japan .................. 63-145238

[51] Int. Cl.⁵ ............................................ B60K 17/34
[52] U.S. Cl. .............................. 364/565; 180/233; 324/161
[58] Field of Search ............... 364/426.01, 565, 566, 364/426.03; 324/160, 161; 180/233, 234, 249, 197

[56] References Cited

U.S. PATENT DOCUMENTS

| | | | |
|---|---|---|---|
| 4,776,421 | 10/1988 | Kashihara | 180/249 |
| 4,777,611 | 10/1988 | Tashiro et al. | 324/161 |
| 4,866,624 | 9/1989 | Nishihawa et al. | 180/249 |
| 4,876,527 | 10/1989 | Oka et al. | 324/160 |

Primary Examiner—Gary Chin
Attorney, Agent, or Firm—Armstrong, Nikaido, Marmelstein, Kubovcik & Murray

[57] ABSTRACT

It is an object of the present invention to provide a method for controlling the vehicle speed during acceleration of a four-wheel drive vehicle, wherein the vehicle speed during acceleration can be determined with precision. According to the above method, even if a wheel is spinning, the vehicle speed can be correctly determined without any influence of the spin, by correcting the vehicle speed during acceleration by comparison of the determined second vehicle speed, based upon the lowest speed of the four wheels, with the first vehicle speed, which is determined based upon the wheel speed.

3 Claims, 4 Drawing Sheets

1

METHOD FOR DETERMINING VEHICLE SPEED DURING ACCELERATION OF A FOUR-WHEEL DRIVE VEHICLE

FIELD OF THE INVENTION

The present invention relates to a method for predicting the vehicle speed during acceleration of a four-wheel drive vehicle.

BACKGROUND OF THE INVENTION

Anti-lock control of a four-wheel drive vehicle is coventionally based upon the vehicle speed. In a two-wheel drive vehicle, the vehicle speed substantially corresponds with the speed of a driven wheel (the speed of a rear wheel in a front-wheel drive vehicle) and hence, during acceleration, the vehicle speed can be determined based upon this driven-wheel speed. In contrast, in a four-wheel drive vehicle, it is difficult to determine the vehicle speed when the wheel(s) spin due to increasing speed of the wheels on a snowy road, a frozen road or the like, because the four-wheel drive vehicle has no driven wheels.

If the vehicle speed during acceleration of the wheels cannot be determined with precision, as described above, the accuracy of the anti-lock control may also be reduced.

SUMMARY OF THE INVENTION

The present invention has been accomplished with the prior art in view, and it is an object of the present invention to provide a method for controlling the vehicle speed during acceleration of a four-wheel drive vehicle, wherein the vehicle speed during acceleration ca be determined with precision.

According to the present invention, a first vehicle speed is determined based upon a wheel speed in such a manner that an acceleration of a determined vehicle speed may be less than a first upper limit acceleration. A second vehicle speed is determined based upon a lowest speed of one of four wheel speeds of the four wheels of the vehicle in such a manner that the acceleration of the determined vehicle speed may be less than a second upper limit acceleration which is lower than the first upper limit acceleration. The vehicle speed during an increase in speed is corrected by comparison of the first vehicle speed with the second vehicle speed.

According to the above method, even if a wheel is spinning, the vehicle speed can be correctly determined without any influence of the spin, by correcting the vehicle speed during acceleration by comparison of the determined second vehicle speed, based upon the lowest speed of the four wheels, with the first vehicle speed, which is determined based upon the wheel speed.

BRIEF DESCRIPTION OF THE DRAWINGS

The drawings illustrate one embodiment of the present invention, wherein.

DESCRIPTION OF THE PREFERRED EMBODIMENTS

Figure 1:
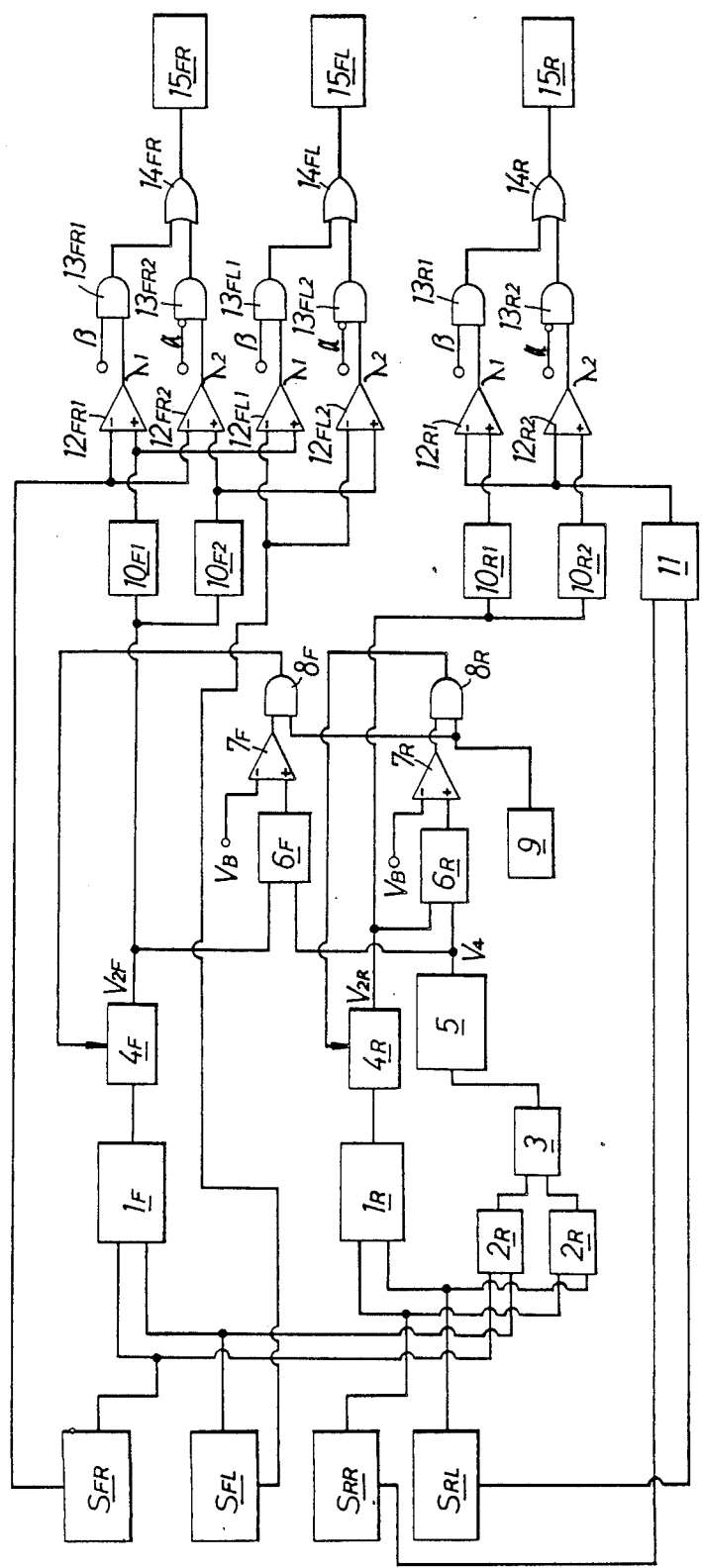
FIG. 1 is a block diagram illustrating an arrangement of an anti-lock control circuit.

The present invention will now be described by way of one embodiment with reference to the accompanying drawings. FIG. 1 illustrates an anti-lock control circuit for a four-wheel drive vehicle. The speeds detected by front-wheel speed detectors, $S_{FL}$ and $S_{FR}$, for independently detecting the wheel speeds of left and right front wheels, are supplied to an arithmetic circuit $1_F$. The speeds detected by rear-wheel speed detectors $S_{RL}$ and $S_{RR}$, for independently detecting the wheel speeds of left and right rear wheels, are supplied to an arithmetic circuit $1_R$. The arithmetic circuits $1_F$ and $1_R$ average the supplied vehicle speeds to give an average wheel speed of the front wheels and an average wheel speed of the rear wheels. Alternatively, in place of the arithmetic circuits $1_F$ and $1_R$, a low select circuit or a high select circuit may be used.

Detection signals from the front-wheel speed detectors $S_{FL}$ and $S_{FR}$ are input to a low select circuit $2_F$, while detection signals from the rear-wheel speed detectors $S_{RL}$ and $S_{RR}$ are input to a low select circuit $2_R$. Signals from the low selection circuit $2_F$ and $2_R$ are supplied to a low select circuit 3. Thus, the lowest one of the wheel speeds of the four wheels, i.e., the front wheels and the rear wheels is delivered by the low select circuit 3.

The wheel speeds obtained in the arithmetic circuits $1_F$ and $1_R$ are input to a first vehicle-speed determining means $4_F$ for the front wheels and a first vehicle-speed determining means $4_R$ for the rear wheels, respectively. First vehicle speeds $V_{1F}$ and $V_{1R}$ are based on the front wheel speed and the rear wheel speed. The wheel speed selected in the low select circuit 3 is input to a second vehicle-speed determining means 5 where a second vehicle speed $V_2$ is determined based upon the wheel speeds of the four wheels.

Figure 2:
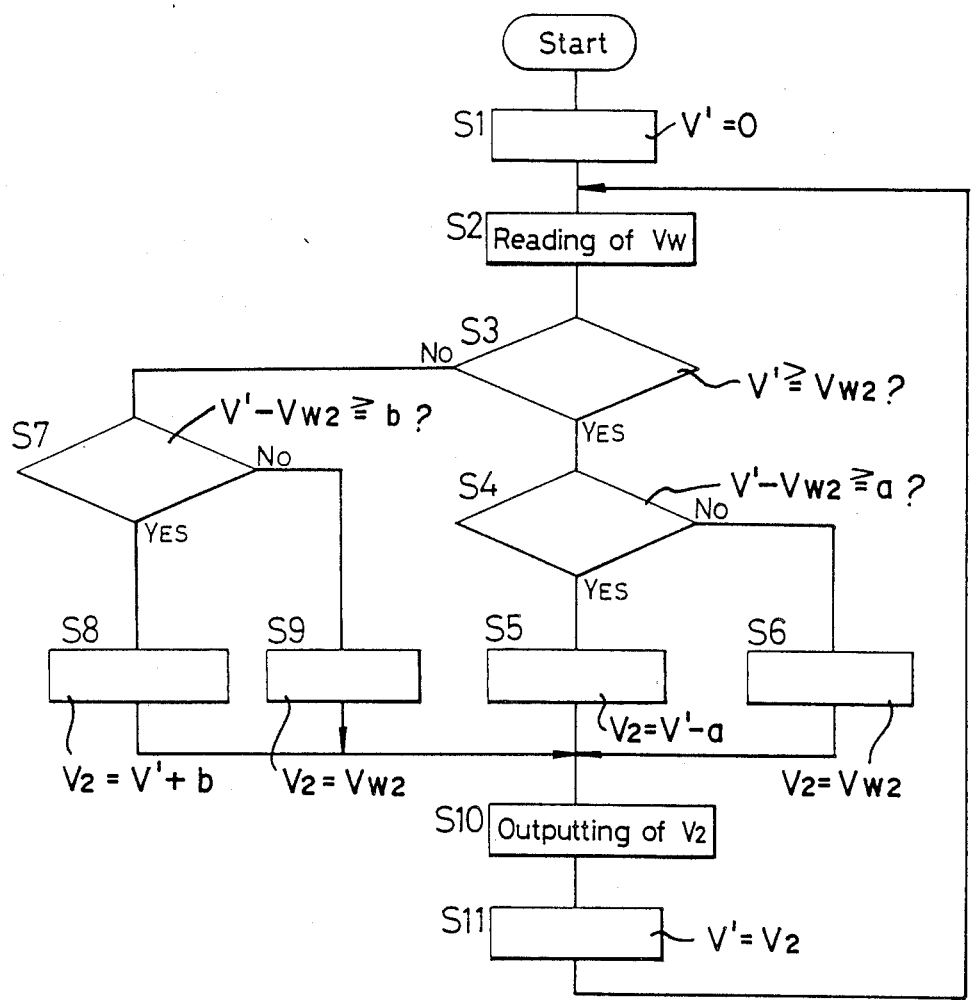
FIG. 2 is a flow chart illustrating the processing of a first vehicle speed determining means.
Figure 3:
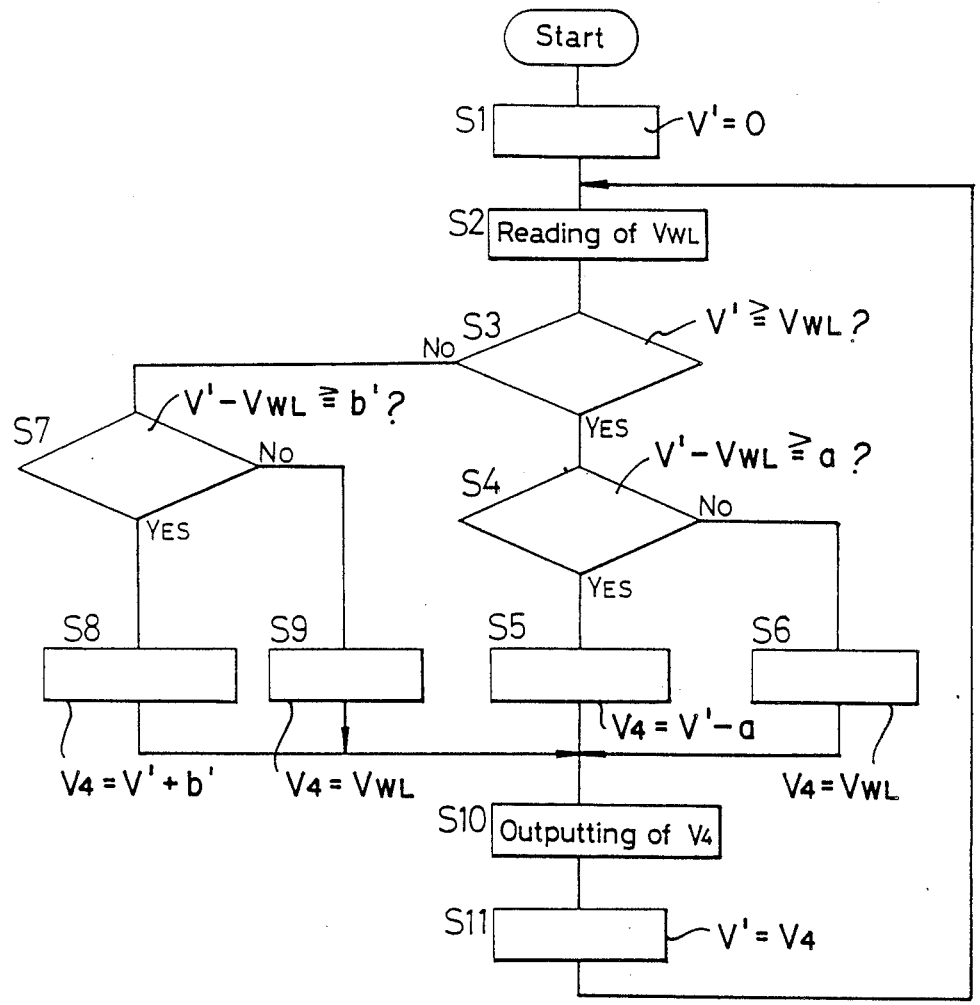
FIG. 3 is a flow chart illustrating the processing of a second vehicle speed determining means.

Each of the vehicle-speed determining means $4_F$, $4_R$ and 5 comprises a computer. In the first vehicle-speed determining means $4_F$ for the front wheels and the first vehicle-speed determining means $4_R$ for the rear wheels, the vehicle speeds are determined according to a control procedure as shown in FIG. 2. In the second vehicle-speed determining means 5, the vehicle speed is determined according to a control procedure as shown in FIG. 3.

Referring to FIG. 2, the control procedure will be first described for the vehicle-speed determining means $4_F$ and $4_R$ for the front and rear wheels. The suffix F for the front wheel and the suffix R for the rear wheel are omitted in FIG. 2. V' represents the vehicle speed obtained in the last processing cycle. In an initial cycle, at step S1, V'=0 is established. At a subsequent second step S2, the wheel speeds from the arithmetic circuits $1_F$ and $1_R$, i.e., the wheel speeds $V_{W2F}$ and $V_{W2R}$ of both front wheels or both rear wheels are read as a temporary vehicle speed.

At a third step S3, a determination is made whether or not the last vehicle speed V' is equal to or greater than the read wheel speed $V_{W2F}$ or $V_{W2R}$ ($V' \geq V_{W2F}$ or $V' \geq V_{W2R}$), (i.e., the speed is decreasing) by comparison with the wheel speed $V_{W2F}$ or $V_{W2R}$ read as the last vehicle speed V'. When $V' \geq V_{W2F}$ or $V' \geq W_{W2R}$, the processing proceeds to a fourth step S4. When $V' < V_{W2F}$ or $V' < V_{W2R}$, i.e., when the speed is increasing, the processing proceeds to a seventh step S7.

At the fourth step S4, a determination is made whether or not the deceleration is equal to or greater than a value a which corresponds to a lower limit deceleration ($V'-V_{W2F} \geq a$ or $V'-V_{W2R} \geq a$). When ($V'-V_{W2F}) \geq a$, or ($V'-V_{W2R}) \geq a$, a new vehicle speed V is corrected to establish $V=(V'-a)$ at a fifth step S5. When ($V'-V_{W2F})<a$ and ($V'-V_{W2R})<a$, $V=V_{W2}$ is established at a sixth step S6. Processing then continues at a tenth step S10.

At the seventh step S7, a determination is made whether or not the acceleration is equal to or greater than a value b which corresponds to a first upper limit acceleration, e.g., 1.0 G ($V'-V_{W2F} \geq b$, or $V'-V_{W2R} \geq b$). When ($V'-V_{W2F}) \geq b$ or ($V'-V_{W2R}) \geq b$, new vehicle speeds $V_{2F}$ and $V_{2R}$ are corrected to establish $V_{2F}=(V'+b)$ or $V_{2R}=(V'+b)$ at an eight step S8. Alternatively, when ($V'-V_{W2F})<b$ or ($V'-V_{W2R})<b$, $V_{2F}=V_{W2F}$ and $V_{W2F}=V_{W2R}$ are established at a ninth step S9. Processing then proceeds to the tenth step S10. It is to be noted that the maximum acceleration of the vehicle is about 0.7 G, but the above-described upper limit of the vehicle is about 0.7 G, but the above-described upper limit acceleration is set at 1.0 G for more accurately determining the vehicle speed during braking.

At the tenth step S10, the determined vehicle speeds $V_{2F}$ and $V_{2R}$ are output as the second vehicle speeds. Then, $V'=V_{2F}$ and $V'=V_{2R}$ are established at an eleventh step S11.

The procedure of determining vehicle speeds in a speed-increasing condition in the first vehicle-speed determining means $4_F$ and $4_R$ will be summarized as follows: First vehicle speeds $V_{2F}$ and $V_{2R}$ are determined based upon the wheel speeds of the two subject wheels in such a manner that the accelerations of the determined vehicle speeds may be less than the first upper limit acceleration b. In this case, when the accelerations of the wheel speeds are higher than the first upper limit acceleration b, the first upper limit acceleration b is determined to be the vehicle acceleration. When the accelerations of the wheel speeds are less than the first upper limit acceleration b, the accelerations of the wheel speeds are determined to be the vehicle accelerations.

Even in the second vehicle speed determining means 5, a first vehicle speed $V_4$ is determined according to a procedure basically similar to that in the above-described first vehicle speed determining means $4_F$ and $4_R$, as shown in FIG. 3, wherein a wheel speed to be read is the lowest speed $V_{WL}$ of the four wheel speeds of the four wheels, and the standard for the determination during increasing speed is a second upper limit acceleration $b'$ set at 0.7 G.

The procedure of determining the vehicle speed in a speed increasing condition in the second vehicle speed determining means 5 will be summarized as follows: A second vehicle speed $V_4$ is determined based upon the lowest speed $V_{WL}$ of the four wheel speeds of the four wheels in such a manner that the acceleration of the determined vehicle speed may be less than the second upper limit acceleration $b'$. In this case, when the acceleration of the lowest wheel speed $V_{WL}$ is higher than the second upper limit acceleration $b'$, the second upper limit acceleration $b'$ is determined to be the vehicle acceleration. When the acceleration of the lowest wheel speed $V_{WL}$ is lower than the second upper limit acceleration $b'$, the acceleration of the lowest wheel speed $V_{WL}$ is determined to be the vehicle acceleration.

The first vehicle speed $V_{2F}$ and $V_{2R}$ obtained in the first vehicle speed determining means $4_F$ and $4_R$ are input into the arithmetic circuits $6_F$ and $6_R$, respectively. The second vehicle speed $V_4$ obtained in the second vehicle speed determining means 4 is also input into the arithmetic circuit $6_F$ and $6_R$.

In the arithmetic circuits $6_F$ and $6_R$, the second vehicle speed $V_4$, obtained in the second vehicle speed determining means 5, is subtracted from the first vehicle speeds $V_{2F}$ and $V_{2R}$ obtained in the first vehicle speed determining means $4_F$ and $4_R$. In other words, ($V_{2F}-V_4$) and ($V_{2R}-V_4$) are obtained in the arithmetic circuits $6_F$ and $6_R$. The arithmetic results are input into noninverted terminals of comparator circuits $7_F$ and $7_R$, respectively. On the other hand, a set velocity $V_B$ is input to each of the inverted input terminals of the comparator circuits $7_F$ and $7_R$. Thus, when the aforesaid arithmetic results ($V_{2F}-V_4$) and ($V_{2R}-V_4$) are larger than the set velocity $V_B$, each of the comparator circuits $7_F$ and $7_R$ produces a high level signal.

An output terminal of each of the comparator circuits $7_F$ and $7_R$ is connected to one of input terminals of the corresponding one of AND circuits $8_F$ and $8_R$. A signal which becomes a high level during acceleration is supplied to the other input terminals of the AND circuit $8_F$ and $8_R$ from a speed-increase sensor 9 which detects the increasing speed condition of the vehicle. Therefore, during acceleration of the vehicle when both first vehicle speeds $V_{2F}$ and $V_{2R}$ are larger than the second vehicle speed $V_4$ by a given value $V_B$ or more, the AND circuits $8_F$ and $8_R$ each produce a high level signal.

Moreover, an output from each of the AND circuits $8_F$ and $8_R$ is input to the corresponding one of the first vehicle speed determining means $4_F$ and $4_R$, where now determined vehicle speeds $V_{2F}$ and $V_{2R}$ are retained, when signals from the AND circuits $8_F$ and $8_R$ each have become a high level.

A signal from the first vehicle speed determining means $4_F$ for the front wheels is supplied to the reference vehicle speed setting circuits $10_{F1}$ and $10_{F2}$. A signal from the first vehicle speed determining means $4_R$ for the rear wheels is supplied to the reference vehicle speed setting circuits $10_{R1}$ and $10_{R2}$. The reference vehicle speed setting circuits $10_{F1}$, $10_{F2}$, $10_{R1}$ and $10_{R2}$ each set a reference vehicle speed required for the antilock control. For example, by simply multiplying the input vehicle speed $V_{2F}$ or $V_{2R}$ by a set value, a reference vehicle speed is obtained.

A reference vehicle speed for each of the reference vehicle speed setting circuits $10_{F1}$ and $10_{F2}$ associated with the front wheels is supplied to a non-inverted terminal of the corresponding one of comparator circuits $12_{FL1}$ and $12_{FL2}$ for the left front wheel and is also supplied to a non-inverted terminal of the corresponding one of comparator circuits $12_{FR1}$ and $12_{FR2}$ for the right front wheel. A reference vehicle speed from each of the reference vehicle speed setting circuits $10_{R1}$ and $10_{R2}$ associated with the rear wheels is supplied to a non-inverted terminal of the corresponding one of comparator circuits $12_{R1}$ and $12_{R2}$ for the rear wheels. Moreover, a left front wheel speed is supplied from a lefthand front wheel speed detector $S_{FL}$ to inverted terminals of the comparator circuits $12_{FL1}$ and $12_{FL2}$ for the left front wheel. A left front wheel speed is supplied from a righthand front wheel speed detector $S_{FR}$ to inverted terminals of the comparator circuits $12_{FR1}$ and $12_{FR2}$ for the right front wheel. The lowest wheel speed obtained by the rear wheel speed detectors $S_{RL}$ and $S_{RR}$ is selected in the low select circuit 11 and is supplied to inverted terminals of the comparator circuits $12_{R1}$ and $12_{R2}$ for the rear wheels.

A signal $\lambda_1$ is delivered from each of the comparators $12_{FL1}$, $12_{FR1}$ and $12_{R1}$ based upon the wheel speeds and becomes a high level when the slippage of the corresponding wheel has exceeded a certain first reference value. This signal $\lambda_1$ is supplied to AND circuits $13_{FL1}$, $13_{FR1}$ and $13_{R1}$. A signal $\lambda_2$ is also delivered from each of the comparators $12_{FL2}$, $12_{FR2}$ and $12_{R2}$ based upon the wheel speeds and becomes a high level when the slippage of the corresponding wheel has exceeded a second reference value which is larger than the aforesaid first reference value. This signal $\lambda_2$ is supplied to AND circuits $13_{FL2}$, $13_{FR2}$ and $13_{R2}$. Further, a signal $\beta$, which becomes a high level when the wheel deceleration has exceeded a certain value, is supplied to the AND circuits $13_{FL1}$, $13_{FR1}$ and $13_{R1}$. A signal $\alpha$, which becomes a high level when the wheel acceleration has exceeded a certain value, is input in an inverted manner to the AND circuits $13_{FL2}$, $13_{FR2}$ and $13_{R2}$.

Accordingly, the AND circuits $13_{FL1}$, $13_{FR1}$ and $13_{R1}$ each produce a high level signal when it is determined that there is a possibility of the wheel being locked in a speed reducing condition where the vehicle speed exceeds the first reference speed. The AND circuits $13_{FL2}$, $13_{FR2}$ and $13_{R2}$ each produce a high level signal when it is determined that there is an increased possibility of the wheel being locked in a condition where the vehicle speed exceeds the second reference speed and is not being increased.

The AND circuits $13_{FL1}$ and $13_{FL2}$ associated with the left front wheel are connected to an OR circuit $14_{FL}$. The AND circuits $13_{FR1}$ and $13_{FR2}$ associated with the right front wheel are connected to an OR circuit $14_{FR}$. The AND circuits $13_{R1}$ and $13_{R2}$ associated with both rear wheels are connected to an OR circuit $14_R$. In turn, the OR circuit $14_{FL}$ is connected to a left front wheel anti-lock control section $15_{FL}$ for reducing the hydraulic braking pressure for a left front wheel brake when a high level signal is input thereto. The OR circuit $14_{FR}$ is connected to a right front wheel anti-lock control section $15_{FR}$ for reducing the hydraulic braking pressure for a right front wheel brake when a high level signal is input thereto. The OR circuit $14_R$ is connected to a two-rear wheel anti-lock control section $15_R$ for reducing the hydraulic braking pressure for a two-rear wheel brake when a high level signal is input thereto.

Figure 4:
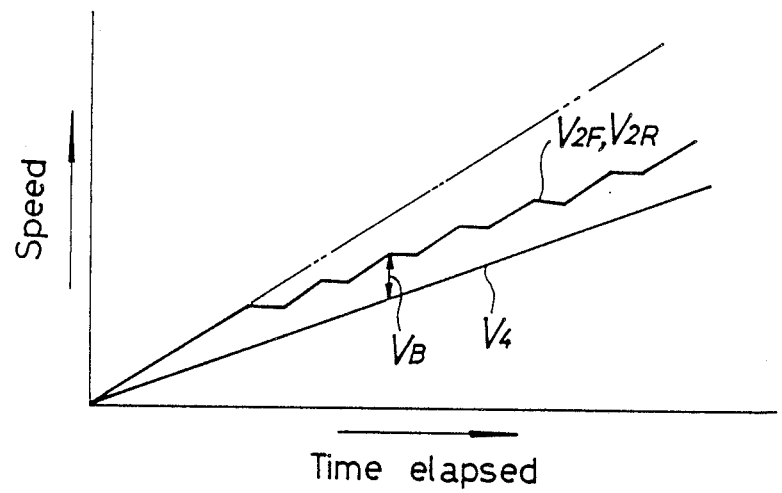
FIG. 4 is a graph illustrating determining a vehicle speed characteristic.

The operation of this embodiment will be described below. A determination of the vehicle speed is required during an anti-lock control. First vehicle speeds $V_{2F}$ and $V_{2R}$ obtained in the first vehicle speed determining means $4_F$ for the front wheels determines the vehicle speed based upon the front wheel speeds. The first vehicle speed determining means for the rear wheels determines the vehicle speed based upon the rear speeds. The front and rear wheel speeds are compared with a second vehicle speed $V_4$ obtained in the second vehicle speed determining means 5, which determines the vehicle speed based upon the lowest speed of the four wheels. When the second vehicle speed V is lower than the first vehicle speeds $V_{2F}$ and $V_{2R}$ by a given value $V_B$ or more, outputs from the first vehicle speed determining means $4_F$ and $4_R$ are maintained constant during increasing speed. Thus, as shown in FIG. 4, the first vehicle speeds $V_{2F}$ and $V_{2R}$ are determined as a value substantially corresponding to the second vehicle speed $V_4$.

As a result, when a spinning wheel occurs, the vehicle speed can be determined as a value which cannot be larger than a vehicle speed based on the lowest of the four wheel speeds of the four wheels. On the basis of the determined vehicle speed, the anti-lock control is performed, leading to an improved accuracy of the anti-lock control.

As discussed above, according to the present invention, a first vehicle speed is determined based upon the wheel speed in such a manner that the acceleration of the determined vehicle speed may be less than a first upper limit acceleration. The second vehicle speed is determined based upon the lowest wheel speed of four wheels. The acceleration of the determined vehicle speed may be less than a second upper limit acceleration which is lower than the first upper limit acceleration. The vehicle speed during acceleration is corrected by comparison of the first vehicle speed with the second vehicle speed. Therefore, even if a spinning wheel is produced in the subject wheel, the determined vehicle speed does not become greater than the vehicle speed based on the lowest wheel speed of the four wheels. This leads to an improved accuracy of determining the vehicle speed.

From the foregoing description of the preferred embodiment of the invention, it will be apparent that many modifications may be made therein. It should be understood that these embodiments are intended as one example of the invention only, and that the invention is not limited thereto. Therefore, it should be understood that the appended claims are intended to cover all modifications that fall within the true spirit and scope of the invention.

What is claimed is:

1. A method for determining an actual vehicle speed during acceleration of a four-wheel drive vehicle, comprising the steps of:
    determining a first vehicle speed based upon a wheel speed when the acceleration of the vehicle is less than a first upper limit acceleration;
    determining a second vehicle speed based upon the lowest wheel speed of four wheels when the acceleration of the vehicle is less than a second upper limit acceleration which is lower than said first upper limit acceleration; and
    determining the actual vehicle speed based upon a result of a comparison of the first vehicle speed with the second vehicle speed.

2. A method for determining the actual vehicle speed during acceleration of a four-wheel drive vehicle according to claim 1, further comprising a step of maintaining the first vehicle speed at a value substantially equal to the second vehicle speed when the second vehicle speed is lower than the first vehicle speed by at least a given value.

3. A method for determining the actual vehicle speed during acceleration of a four-wheel drive vehicle according to claim 1 or 2 further comprising the step of, during the determination of the second vehicle speed, determining the second upper limit acceleration as the vehicle acceleration when the acceleration of the wheel which has the lowest wheel speed of the four wheels is higher than the second upper limit acceleration and determining the acceleration of the wheel which has the lowest wheel speed of the four wheels as the vehicle acceleration when the acceleration of the wheel which has the lowest one of the four wheel speeds of the four wheels is less than or equal to the second upper limit acceleration.

\* \* \* \* \*